(12) United States Patent
Hou et al.

(10) Patent No.: US 7,829,642 B2
(45) Date of Patent: Nov. 9, 2010

(54) POLYMERIZATION CATALYST COMPOSITION FOR POLYMERIZATION OF ISOPRENE COMPOUND

(75) Inventors: Zhaomin Hou, Wako (JP); Lixin Zhang, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 12/282,148

(22) PCT Filed: Feb. 5, 2007

(86) PCT No.: PCT/JP2007/051929

§ 371 (c)(1),
(2), (4) Date: Sep. 8, 2008

(87) PCT Pub. No.: WO2007/105388

PCT Pub. Date: Sep. 20, 2007

(65) Prior Publication Data

US 2009/0030167 A1    Jan. 29, 2009

(30) Foreign Application Priority Data

Mar. 10, 2006    (JP) ............... 2006-065855

(51) Int. Cl.
  *C08F 36/08*    (2006.01)
  *C08F 36/04*    (2006.01)
  *C08F 4/44*    (2006.01)
(52) U.S. Cl. ............ 526/164; 526/172; 526/161; 526/340.2; 526/335
(58) Field of Classification Search ........... 526/164, 526/161, 134, 172, 335, 340.2
See application file for complete search history.

(56) References Cited

U.S. PATENT DOCUMENTS 5,484,897 A * 1/1996 Garbassi et al. ............. 534/15
2004/0033889 A1 * 2/2004 Hessen et al. ............... 502/103

FOREIGN PATENT DOCUMENTS

JP    2007-161919 A  *  6/2007

WO    WO-2005/085306    9/2005

OTHER PUBLICATIONS

Bambirra et al., J. Am. Chem. Soc. 2004, 126, 9182-9183.*
Suzuki et al. (JP 2007-161919 A). Jun. 2007, abstract and translation in English.*
Bambirra, et al., "One Ligand Fits All: Cationic Mono(amidinate) Alkyl Catalysts over the Full Size Range of the Group 3 and Lanthanide Metals," J.Am.Chem.Soc., vol. 126 (30), pp. 9182-9183 (2004).
Nakayama, et al., "Stereospecific Polymerizations of Conjugated Dienes by Single Site Iron Complexes Having Chelating N,N,N-Donor Ligands," Macromolecules, vol. 36 (21), pp. 7953-7958 (2003).
Natta, et al., "Polymerization of Conjugated Diolefins by Homogeneous Aluminum Alkyl-Titanium Alkoxide Catalyst Systems," Die Makromolekulare Chemie, Band 77, pp. 126-138 (1964).
Translation of International Preliminary Examination Report.

* cited by examiner

*Primary Examiner*—Rip A. Lee
(74) *Attorney, Agent, or Firm*—Birch, Stewart, Kolasch & Birch, LLP

(57) ABSTRACT

3,4-isoprene-based polymer having high isotacticity can be produced by polymerizing an isoprene compound using a complex represented by the general formula (A) and a catalyst activator:

(A)

$$R^1-N\overset{\overset{\displaystyle R^3}{\displaystyle |}}{\underset{\underset{\displaystyle L_w}{\displaystyle M}}{\overset{\displaystyle C}{\diagup\diagdown}}}N-R^2$$
$$Q^1\quad Q^2$$

wherein $R^1$ and $R^2$ independently represent an alkyl group, a cyclohexyl group, an aryl group or an aralkyl group; $R^3$ represents an alkyl group, an alkenyl group, an alkynyl group, an aryl group, an aralkyl group, an aliphatic, aromatic or cyclic amino group, a phosphino group, a boryl group, an alkylthio or arylthio group, or an alkoxy or aryloxy group; M represents a rare earth element selected from Sc, Y, and La to Lu with promethium (Pm) excluded; Q1 and Q2 independently represent a monoanionic ligand; L represents a neutral Lewis base; and w represents an integer of 0 to 3.

10 Claims, 7 Drawing Sheets

[FIG. 1]
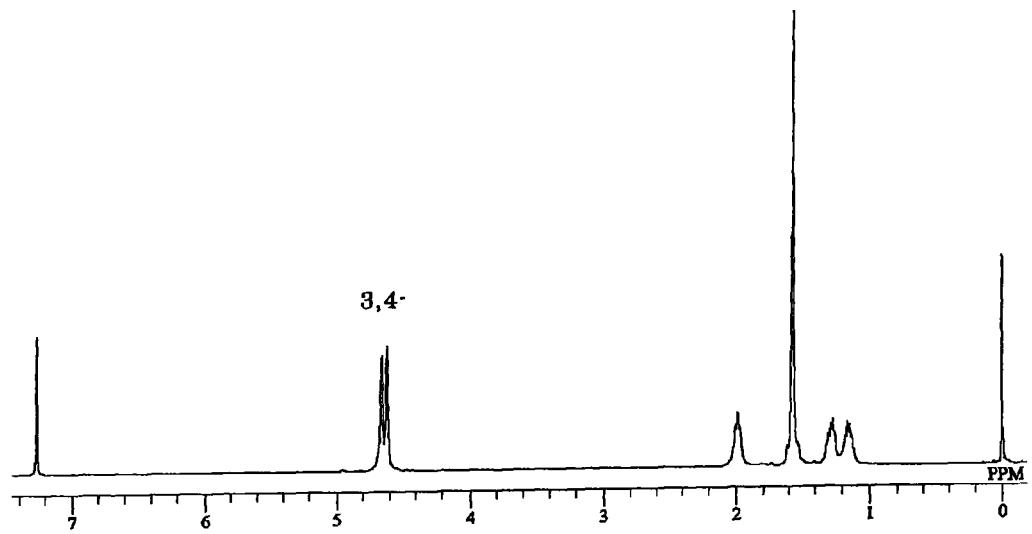
[FIG. 2]
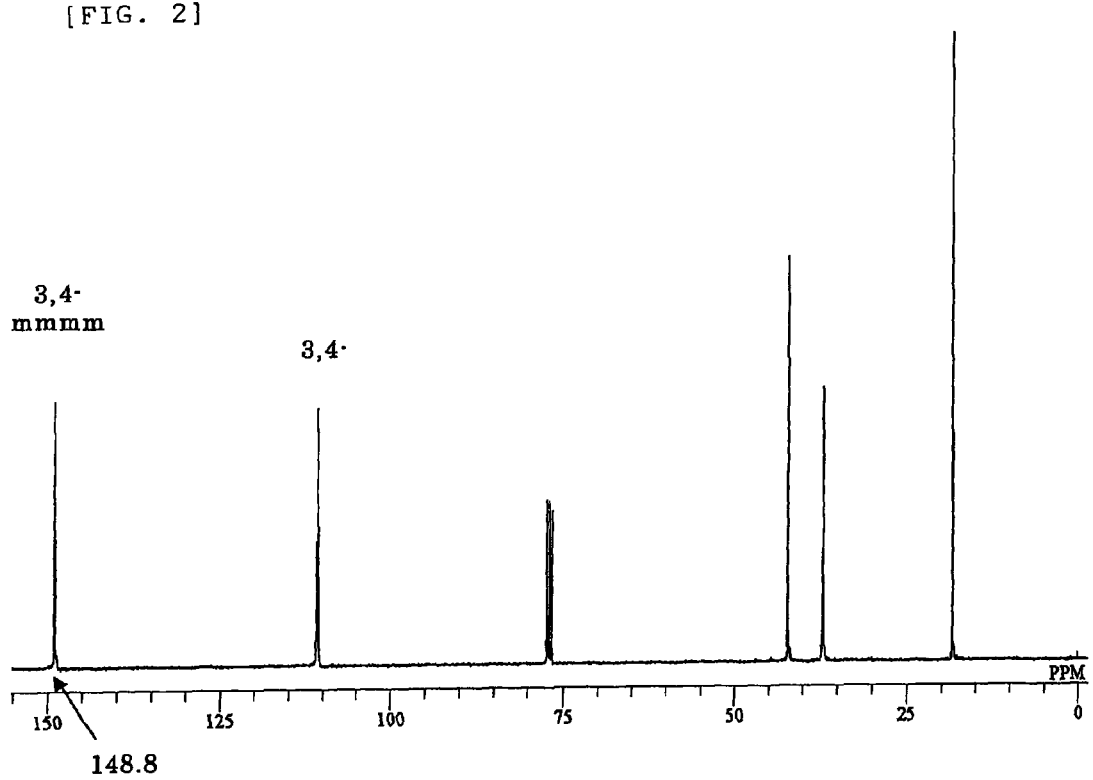

[FIG. 3]
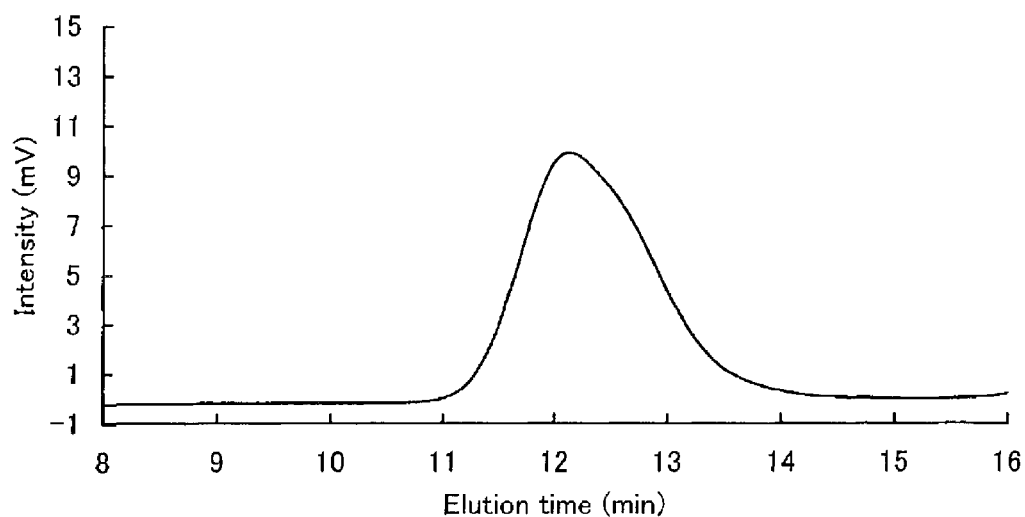
[FIG. 4]
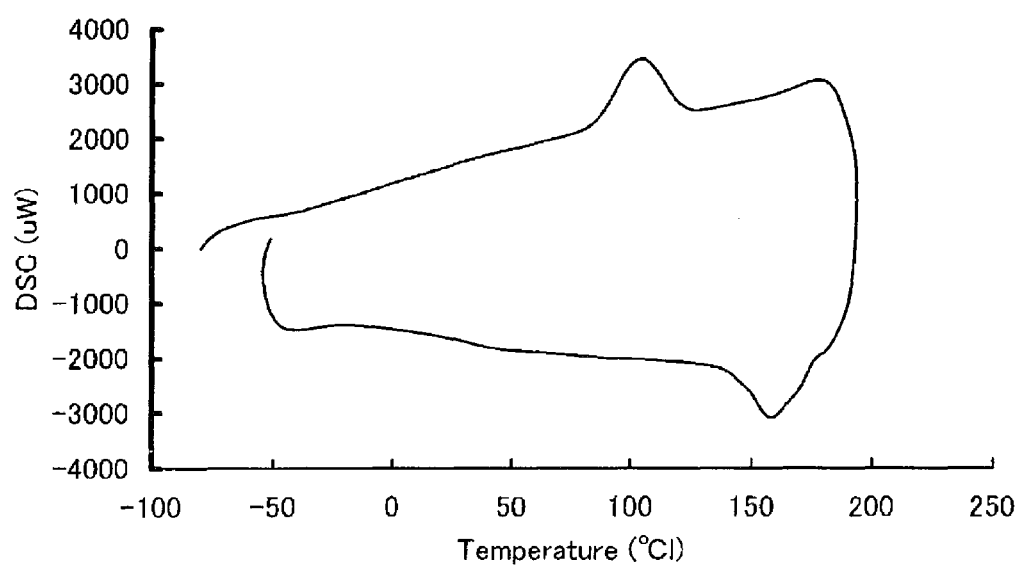

[FIG. 5]
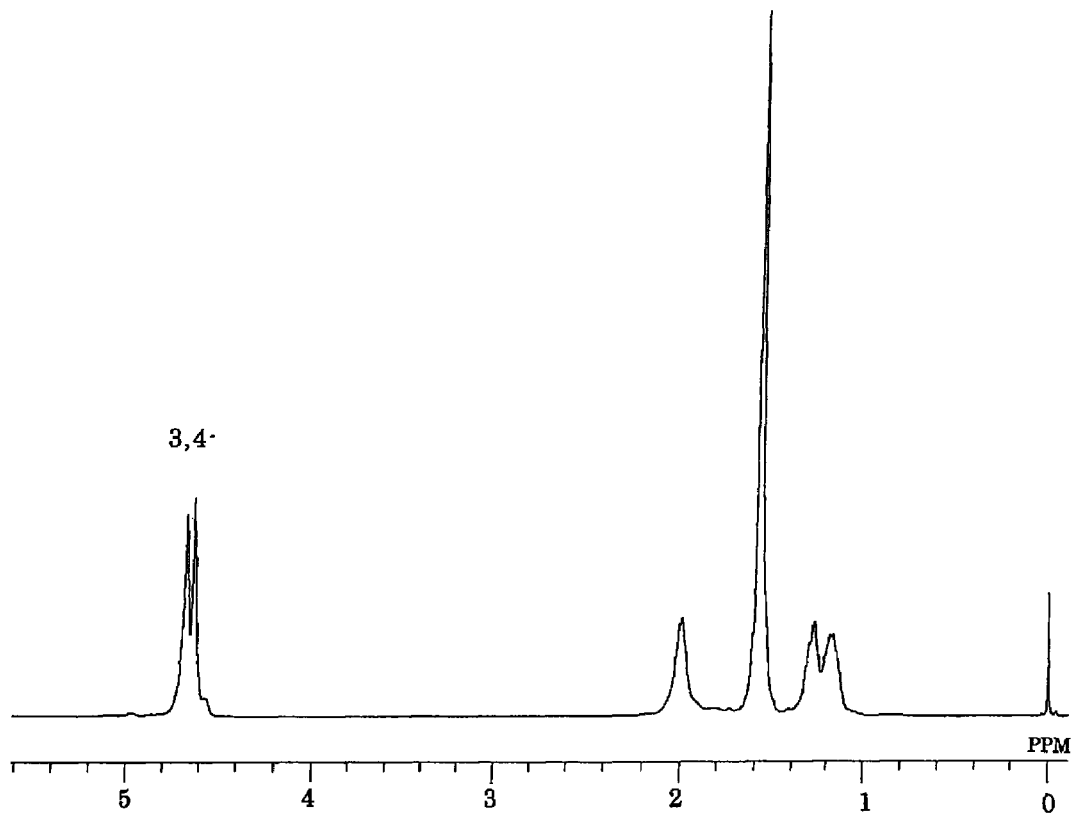

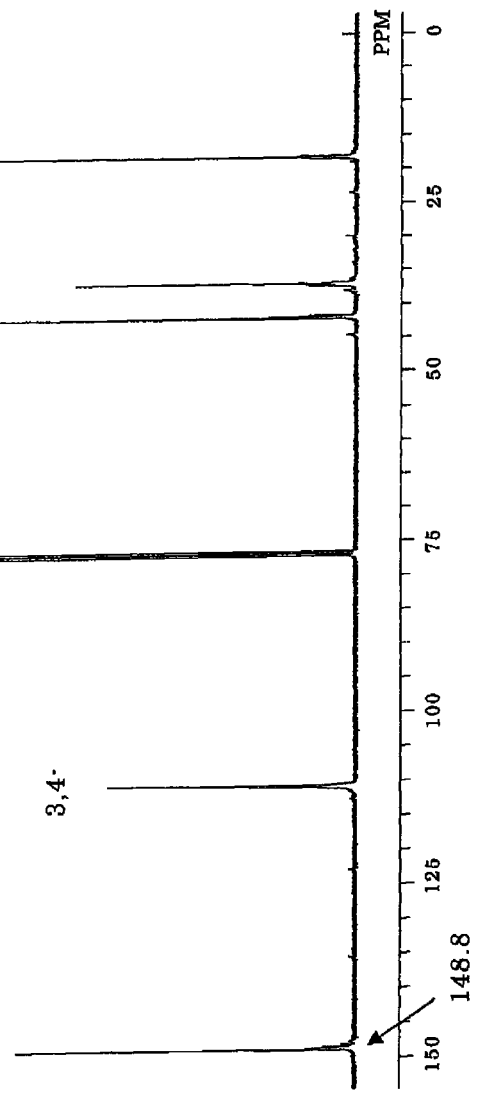
[FIG. 6]

[FIG. 7]
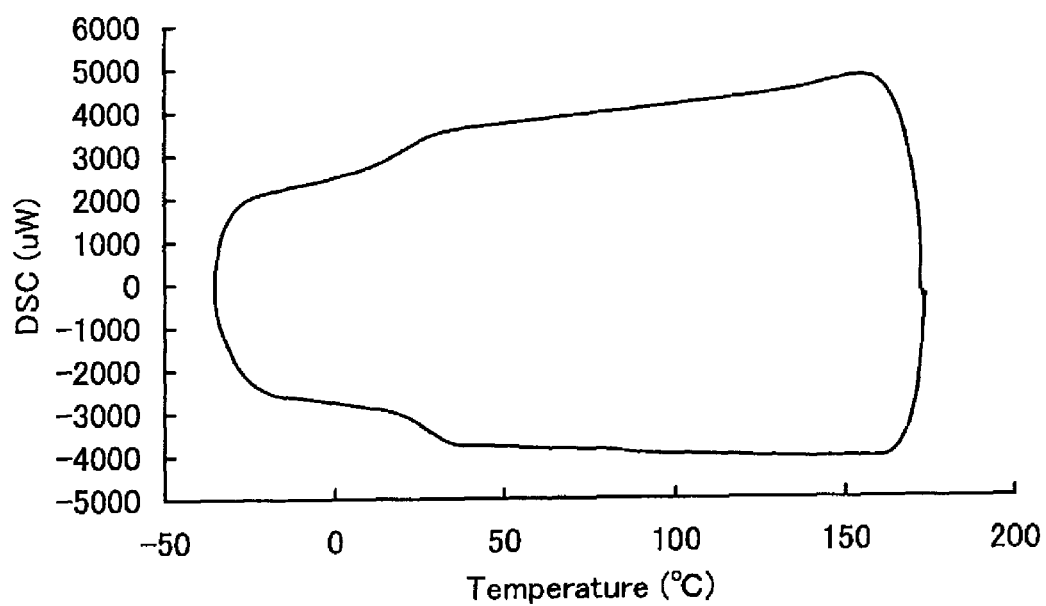

[FIG. 8]
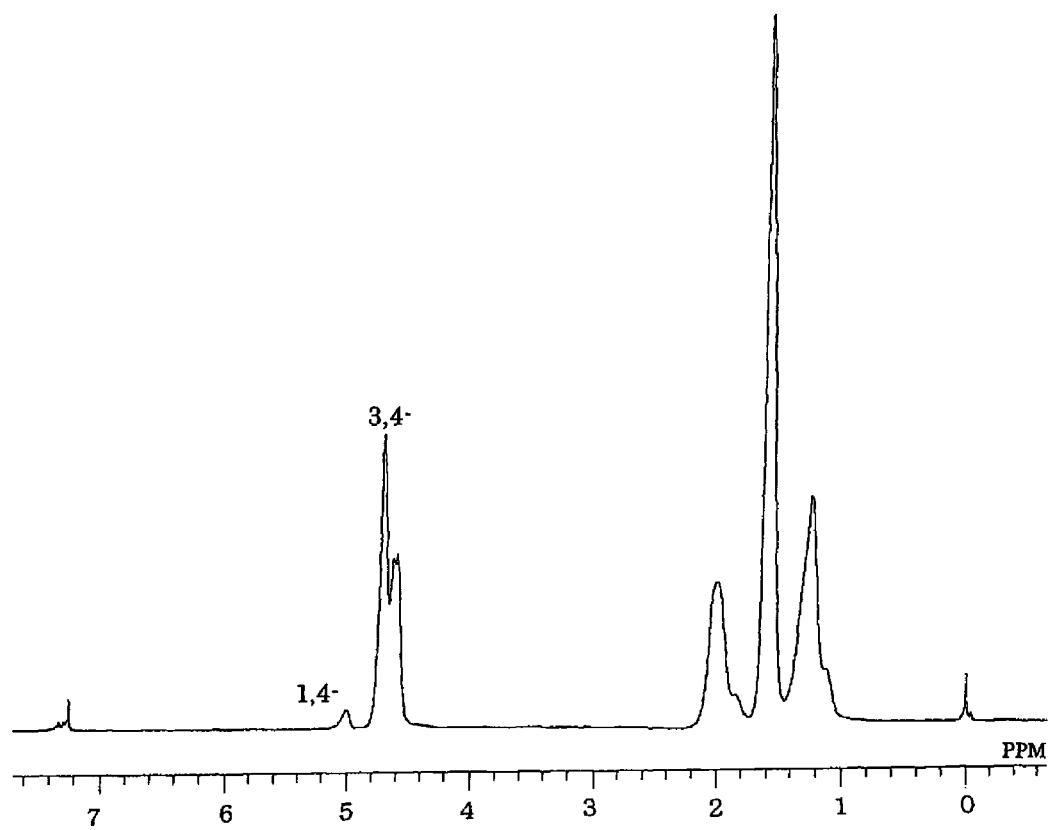

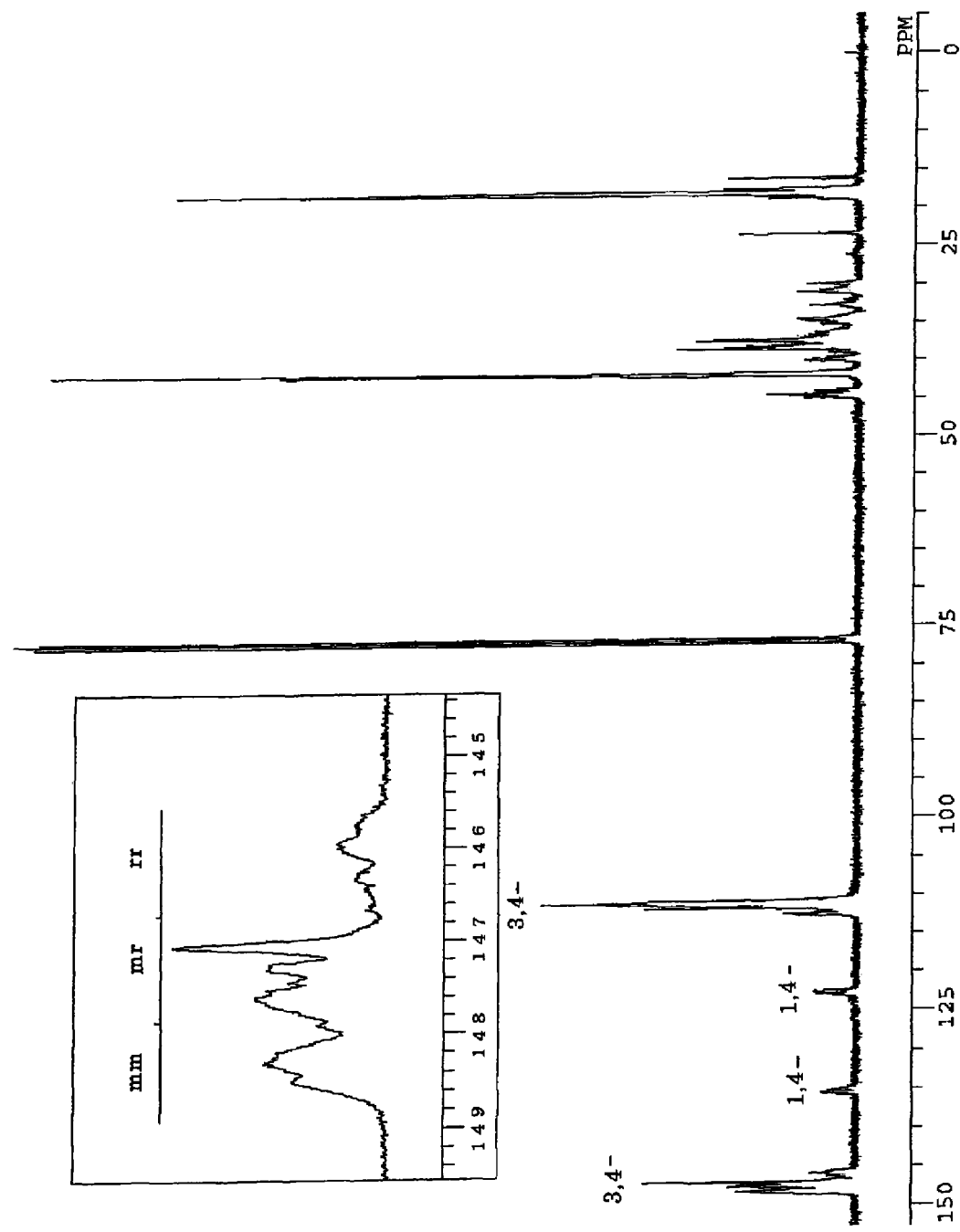
[FIG. 9]

POLYMERIZATION CATALYST COMPOSITION FOR POLYMERIZATION OF ISOPRENE COMPOUND

This Application is the National Phase Under 35 U.S.C. §371 of PCT International Application No. PCT/JP2007/051929 which has an International filing date of Feb. 5, 2007, which claims priority to Japanese Application No. 2006-065855 filed on Mar. 10, 2006.

TECHNICAL FIELD

The present invention relates to a method of producing an isoprene-based polymer, more particularly an isoprene-based polymer which has high regioselectivity and high tacticity, and preferably a polyisoprene, and to a polymerization catalyst composition to be used for the method.

BACKGROUND ART

A polyisoprene may have the following four different structural units. That is, the polymer may have: a 3,4-bond structural unit represented by Formula (I'); a trans 1,4-bond structural unit represented by Formula (II'); a cis 1,4-bond structural unit represented by Formula (III'); and a 1,2-bond structural unit represented by Formula (IV').

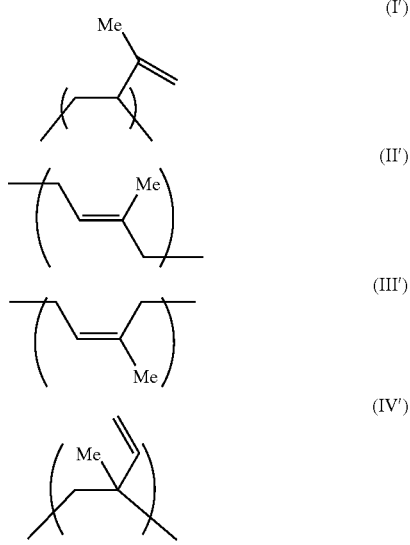

The following two reports have been made on productions of polyisoprene that selectively have, among the above-mentioned structural units, the structural units represented by Formula (I'). One is a report on production of the above-mentioned polymer by polymerizing isoprene using an alkylaluminum-titanium alkoxide ($AlEt_3$-$Ti(OC_3H_7$-$n)_4$)-based catalyst as a polymerization catalyst (see Non-patent Document 1). The other is a report on production of the above-mentioned polymer by polymerizing isoprene using a complex in which sparteine is coordinated to $FeCl_2$ as a polymerization catalyst (see Non-patent Document 2).

Meanwhile, the polyisoprene selectively having the structural units represented by Formula (I') is considered to have significantly different properties depending on the tacticity based on an arrangement of the structural units. Like a polyisoprene consisting of the structural units represented by Formula (I'), a polymer having a main chain atom with two different side chain substituents may have two kinds of stereoisomer. The "tacticity" means a manner or order of arrangement of the moieties involved in stereoisomerism in a main chain of a polymer. A polymer in which one type of substituents of different two types of side chain substituents is bound only to one side of the plane through the main chain of the polymer is referred to as an isotactic polymer (represented by Formula (V) below), while a polymer in which one type of substituents is alternately bound to the both sides of the plane is referred to as a syndiotactic polymer (represented by Formula (VI) below). Meanwhile, such a polymer with no regularity is referred to as an atactic polymer.

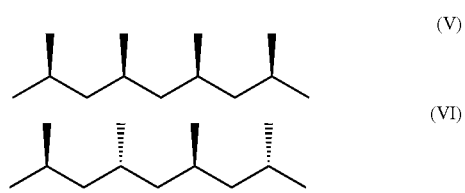

The above-mentioned Non-patent Document 1 describes that the resultant polyisoprene is an atactic polymer, while Non-patent Document 2 does not describe the tacticity of the resultant polyisoprene. Therefore, a polyisoprene that selectively has Formula (I') and has high tacticity has been required.

Under such a technical background, a method of producing a polyisoprene having high tacticity has been reported (Patent Document 1). In this method, a polyisoprene is polymerized using a metallocene-based catalyst. Polymerization of isoprene using such a catalyst can produce a polyisoprene having high tacticity but now has a problem with high cost of the catalyst.

Therefore, another catalyst for producing an isoprene-based polymer such as a polyisoprene having high tacticity at low cost has been required.

On the other hand, production of polyethylene using a non-metallocene-based catalyst including amidine has been reported (Non-Patent Document 3). This document shows that yield of polyethylene varies by changing a central metal. However, production of an isoprene-based polymer having high tacticity has not been reported.

Patent Document 1: WO 05/085306

Non-patent Document 1: Makromolekulare Chem (1964), 77, pp. 126-138.

Non-patent Document 2: Macromolecules (2003), 36, pp. 7953-7958.

Non-patent Document 3: J. AM. CHEM. SOC. (2004), 126, pp. 9182-9183.

DISCLOSURE OF THE INVENTION

The present invention has been made under such circumstances, and an object of the present invention is to provide a polymerization catalyst composition for producing an isoprene-based polymer that selectively has the structural units represented by formula (Y) to be described below and has high tacticity of an arrangement of the structural units (in particular, isotactic-rich isoprene-based polymer) at low cost, and a method of producing an isoprene-based polymer having high tacticity using the polymerization catalyst composition.

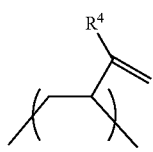

(Y)

(In Formula (Y), $R^4$ represents an alkyl group having 1 to 10 carbon atoms or an alkenyl group having 1 to 10 carbon atoms.)

That is, the present invention is as follows.

(1) A polymerization catalyst composition for polymerization of an isoprene-based compound represented by Formula (X) containing a complex represented by Formula (A) and a catalyst activator:

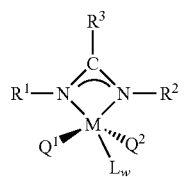

(A)

in which each of $R^1$ and $R^2$ independently represents an alkyl group, a cyclohexyl group, an aryl group, or aralkyl group, $R^3$ represents an alkyl group, an alkenyl group, an alkynyl group, an aryl group, an aralkyl group, an aliphatic, aromatic, or cyclic amino group, a phosphino group, a boryl group, an alkyl or arylthio group, or an alkoxy or aryloxy group;

M represents a rare earth element selected from scandium (Sc), yttrium (Y), and lanthanum (La) to lutetium (Lu) with promethium (Pm) excluded;

each of $Q^1$ and $Q^2$ independently represents a monoanionic ligand,

L represents a neutral Lewis base; and w represents an integer of 0 to 3;

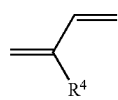

(X)

in which $R^4$ represents an alkyl group having 1 to 10 carbon atoms or an alkenyl group having 1 to 10 carbon atoms.

(2) A polymerization catalyst composition according to item (1), characterized in that, in Formula (A), each of $R^1$ and $R^2$ represents a 2,6-diisopropylphenyl group, and $R^3$ represents a phenyl group.

(3) A polymerization catalyst composition according to item (1) or (2), characterized in that the complex represented by Formula (A) is a compound represented by Formula (B):

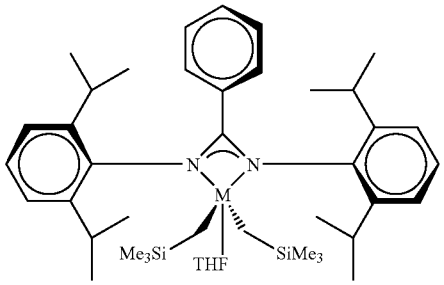

(B)

in which M represents a rare earth element selected from scandium (Sc), yttrium (Y), and lanthanum (La) to lutetium (Lu) with promethium (Pm) excluded.

(4) A polymerization catalyst composition according to item (1) or (2), characterized in that the complex represented by Formula (A) is a compound represented by Formula (C):

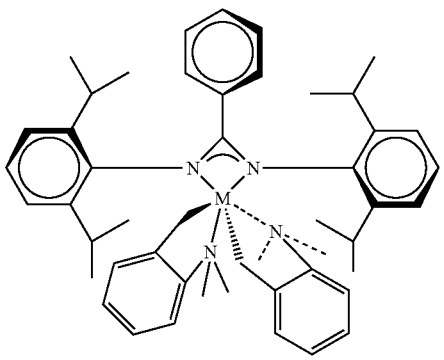

(C)

in which M represents a rare earth element selected from scandium (Sc), yttrium (Y), and lanthanum (La) to lutetium (Lu) with promethium (Pm) excluded.

(5) A polymerization catalyst composition according to any one of items (1) to (4), characterized in that the catalyst activator is an ionic compound composed of a non-coordinating anion and cation.

(6) A polymerization catalyst composition according to item (5), characterized in that the non-coordinating anion is a tetravalent boron anion.

(7) A method of producing an isoprene-based polymer including polymerizing an isoprene-based compound represented by Formula (X) using a polymerization catalyst composition according to any one of items (1) to (6).

(8) A production method according to item (7), characterized in that $R^4$ in Formula (X) is a methyl group.

(9) A production method according to item (7) or (8), characterized in that:

the polymerization is solution polymerization; and the polymerization reaction temperature is 0° C. or lower.

BRIEF DESCRIPTION OF THE DRAWINGS

FIG. 1 An $^1$H-NMR spectrum chart of the polyisoprene obtained in Example 1.

FIG. 2 A $^{13}$C-NMR spectrum chart of the polyisoprene obtained in Example 1.

FIG. 3 A GPC chart of the polyisoprene obtained in Example 1.

FIG. 4 A DSC chart of the polyisoprene obtained in Example 1.

FIG. 5 An $^1$H-NMR spectrum chart of the polyisoprene obtained in Example 4.

FIG. 6 A $^{13}$C-NMR spectrum chart of the polyisoprene obtained in Example 4.

FIG. 7 A DSC chart of the polyisoprene obtained in Example 4.

FIG. 8 A $^1$H-NMR spectrum chart of the polyisoprene obtained in Referential Example 1.

FIG. 9 A $^{13}$C-NMR spectrum chart of the polyisoprene obtained in Referential Example 1.

BEST MODE FOR CARRYING OUT THE INVENTION

The polymerization catalyst composition of the present invention is characterized by containing a complex represented by Formula (A) above and a catalyst activator.

In Formula (A), each of $R^1$ and $R^2$ independently represents an alkyl group, a substituted or unsubstituted cyclohexyl group, a substituted or unsubstituted aryl group, or a substituted or unsubstituted aralkyl group. Examples of the alkyl group include methyl group, ethyl group, isopropyl group, n-butyl group, and t-butyl group. Examples of the substituted cyclohexyl group include cyclohexyl group including an alkyl group as a substituent, for example, methylcyclohexyl group. Examples of the unsubstituted aryl group include phenyl group, and examples of the substituted aryl group include phenyl group including an alkyl group as a substituent. Examples of the unsubstituted aralkyl group include benzyl group, and examples of the substituted aralkyl group include benzyl group including an alkyl group as a substituent. Of those, phenyl group including an alkyl group as a substituent is preferable, and 2,6-diisopropylphenyl group is particularly preferable. $R^1$ and $R^2$ may be the same or different, and both of $R^1$ and $R^2$ are preferably phenyl groups each including an alkyl group as a substituent, and more preferably 2,6-diisopropylphenyl groups.

$R^3$ represents an alkyl group, an alkenyl group, an alkynyl group, an aryl group, an aralkyl group, an aliphatic, aromatic, or cyclic amino group, a phosphino group, a boryl group, an alkylthio or arylthio group, or an alkoxy or aryloxy group. Of those, an aryl group is preferable, and a phenyl group is particularly preferable.

The complex in the polymerization catalyst composition of the present invention preferably has a structure of N,N'-bis(2,6-diisopropylphenyl)benzamidinate (NCN) in which both of $R^1$ and $R^2$ are 2,6-diisopropylphenyl groups and $R^3$ is a phenyl group.

In Formula (A), the central metal (M) represents a rare earth element selected from scandium (Sc), yttrium (Y), and lanthanum (La) to lutetium (Lu) with promethium (Pm) excluded. In the complex in the polymerization catalyst composition of the present invention, the central metal (M) may be appropriately selected depending on the type of a monomer to be polymerized, and the metal is preferably scandium (Sc), yttrium (Y), or lutetium (Lu), and particularly preferably scandium (Sc).

In Formula (A), $Q^1$ and $Q^2$ are monoanionic ligands. Examples of the monoanionic ligand include, but are not limited to, 1) a hydride, 2) a halide, 3) a substituted or unsubstituted hydrocarbyl group each having 1 to 20 carbon atoms, 4) a substituted or unsubstituted alkoxy or aryloxy group each having 1 to 20 carbon atoms, 5) a substituted or unsubstituted amide group (including a silylamide group) each having 1 to 20 carbon atoms, and 6) a phosphino group, and preferably include a hydrocarbyl group.

In addition, $Q^1$ and $Q^2$ may bind to each other or may together serve as dianionic ligands. Examples of the dianionic ligand include alkylidene, diene, a cyclometallized hydrocarbyl group, and a bidentate chelate ligand.

The halide may be any one of the chloride, bromide, fluoride, and iodide.

The hydrocarbyl group having 1 to 20 carbon atoms may be an alkyl group such as methyl group, ethyl group, propyl group, isopropyl group, butyl group, isobutyl group, t-butyl group, pentyl group, amyl group, isoamyl group, hexyl group, cyclohexyl group, heptyl group, octyl group, nonyl group, decyl group, cetyl group, or 2-ethylhexyl group; an alkenyl group such as vinyl group, 1-propenyl group, isopropenyl group, allyl group, methallyl group, or crotyl H group; an alkynyl group such as ethynyl group or 3,3-dimethyl-1-butynyl group; an aryl group such as phenyl group or tolyl group; an aralkyl group such as a phenylalkyl group including benzyl group, diphenylmethyl group, phenylethyl group, or diphenylethyl group; a trialkylsilylmethyl group; a bis(trialkylsilyl)methyl group; a 2-phenylethynyl group; a 2-(trimethylsilyl)ethynyl group; a methylphenyl group; a dimethylphenyl group; an aminophenyl group; an aminobenzyl group such as o-N,N-dimethylaminobenzyl group; a thiobenzyl group such as o-(methylthio)benzyl group; an alkoxybenzyl group such as o-methoxybenzyl group; or a phosphinobenzyl group such as o-(dimethylphosphino)benzyl group.

In the present invention, $Q^1$ and $Q^2$ each are preferably trialkylsilylmethyl group or aminobenzyl group. Examples of three alkyl groups on the silyl element of the trialkylsilylmethyl group include a linear chain group or a branched chain group each having about 1 to 6 carbon atoms and preferably about 1 to 4 carbon atoms, and include more preferably methyl group. As the trialkylsilyl, trimethylsilyl and t-butyldimethylsilyl can be exemplified. As the aminobenzyl group, o-N,N-dimethylaminobenzyl group can be preferably exemplified.

The alkoxy group or aryloxy group preferably includes methoxy group and a substituted or unsubstituted phenoxy group.

Preferable examples of the amide group include dimethylamide group, diethylamide group, methylethylamide group, di-t-butylamide group, diisopropylamide group, an unsubstituted or substituted diphenylamide group, and bis(trimethylsilyl)amide group.

Preferable examples of the phosphino group include diphenylphosphino group, dicyclohexylphosphino group, diisopropylphosphino group, diethylphosphino group, and dimethylphosphino group.

The alkylidene preferably includes methylidene, ethylidene, propylidene, and benzylidene.

Preferable examples of the cyclometallized hydrocarbyl group include propylene, butylene, pentylene, hexylene, and octylene.

Preferable examples of the diene include 1,3-butadiene, 1,3-pentadiene, 1,4-pentadiene, 1,3-hexadiene, 1,4-hexadiene, 1,5-hexadiene, 2,4-dimethyl-1,3-pentadiene, 2-methyl-1,3-hexadiene, and 2,4-hexadiene.

In Formula (I), L represents a neutral Lewis base. Examples of the neutral Lewis base include tetrahydrofran (THF), diethylether, dimethylaniline, trimethylphosphine, and lithium chloride. Of those, tetrahydrofran is preferable.

The neutral Lewis base (L) may bind to $Q^1$ and/or $Q^2$ to serve as a so-called multidentate ligand.

The character "w" of $L_w$ in Formula (I) represents the number of the neutral Lewis base. The character "w" represents generally an integer of 0 to 3, preferably 0 or 1 although the number varies depending on the type of the central metal (M) or the like.

The complex in the polymerization catalyst composition of the present invention, represented by Formula (A), is preferably a compound represented by Formula (B) or (C) above. In Formula (B) or (C), the central metal (M) represents a rare earth element selected from scandium (Sc), yttrium (Y), and lanthanum (La) to lutetium (Lu) with promethium (Pm) excluded. In the complex in the polymerization catalyst composition of the present invention, the central metal (M) is preferably scandium (Sc), yttrium (Y), or lutetium (Lu), particularly preferably scandium (Sc) although the central metal (M) may be appropriately selected depending on the type of a monomer to be polymerized.

The catalyst activator in the polymerization catalyst composition of the present invention includes an ionic compound, an alkylaluminum compound, a Lewis acid, or the like, and preferably includes an ionic compound composed of a non-coordinating anion and cation. The catalyst activator can activate the complex of the present invention to exert the polymerization catalyst activity. The activation mechanism is as follows: the complex reacts with the catalyst activator to eliminate any of a plurality of ligands ($Q^1$ or $Q^2$) coordinated in the rare earth metal atom of the complex, resulting in producing a cationic complex (active species).

As the non-coordinating anion of the ionic compound, a tetravalent boron anion is preferable, for example. Examples of a compound producing the tetravalent boron anion include tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (pentafluorophenyl)triphenylborate, [tris(pentafluorophenyl),phenyl]borate, and tridecahydride-7,8-dicarbaundecaborate.

Examples of the cation of the ionic compound can include a carbonium cation, an oxonium cation, an ammonium cation, a phosphonium cation, a cycloheptatrienyl cation, and a ferrocenium cation having a transition metal. Specific examples of the carbonium cation can include a trisubstituted carbonium cation such as a triphenylcarbonium cation and a tri(substituted phenyl)carbonium cation. Specific examples of the tri(substituted phenyl)carbonium cation can include tris(methylphenyl)carbonium cation and tris(dimethylphenyl)carbonium cation. Specific examples of the ammonium cation can include: a trialkylammonium cation such as trimethylammonium cation, triethylammonium cation, tripropylammounium cation, tri(t-butyl)ammonium cation, or tri(n-butyl)ammonium cation; an N,N-dialkylanilinium cation such as N,N-diethylanilinium cation or N,N-2,4,6-pentamethylanilinium cation; and a dialkylammonium cation such as di(isopropyl)ammonium cation and dicyclohexylammonium cation. Specific examples of the phosphonium cation can include a triarylphosphonium cation such as triphenylphosphonium cation, tris(methylphenyl)phosphonium cation, and tris(dimethylphenyl)phosphonium cation.

That is, compounds in combination each selected from the non-coordinating anions and the cations can be used as the ionic compound. Examples thereof preferably include triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferrocenium tetrakis(pentafluorophenyl)borate. Of those, triphenylcarbonium tetrakis(pentafluorophenyl)borate and N,N-dimethylanilinium tetrakis(pentafluorophenyl)borate are preferable. One ionic compound may be used alone, or two or more of them may be used in combination. In addition, $B(C_6F_5)_3$, $Al(C_6F_5)_3$, and the like can be used as a Lewis acid that can produce cationic transition metal compounds through a reaction with a transition metal compound. Any one of them may be used in combination with the ionic compound.

The polymerization catalyst composition of the present invention may include at least one of complexes represented by Formula (A) and at least one catalyst activator, and preferably includes at least one of complexes represented by Formulae (B) and (C) and at least one of triphenylcarbonium tetrakis(pentafluorophenyl)borate ($[Ph_3C][B(C_6F_5)_4]$) and N,N-dimethylanilinium tetrakis(pentafluorophenyl)borate ($[PhMe_2NH][B(C_6F_5)_4]$). The composition particularly preferably includes $[Ph_3C][B(C_6F_5)_4]$ and a complex selected from (NCN)Sc($CH_2SiMe_3$)$_2$(THF), (NCN)Y($CH_2SiMe_3$)$_2$(THF), and (NCN) Sc ($CH_2C_6H_4NMe_2$-o)$_2$.

In the polymerization catalyst composition of the present invention, the complex represented by Formula (A) may be used in any amount, and the amount may be adjusted depending on the amount of an isoprene-based compound to be polymerized and the molecular weight of an isoprene-based polymer to be produced. The amount is preferably adjusted so as to be suitable for the method of producing an isoprene-based polymer described below. The amount of the catalyst activator may be adjusted in the same way as above, and is generally 0.5 to 5 mol, preferably about 1 mol with respect to 1 mol of the complex.

The polymerization catalyst to be used in the production method of the isoprene-based polymer may further include a third component such as an organic aluminum-based compound or aluminoxane. Addition of the organic aluminum-based compound or aluminoxane may promote removal of impurities in a reaction system or chain transfer, so that the activity of the catalyst, molecular weight of the resultant polymer, or the like is expected to change.

The polymerization catalyst composition of the present invention is used for polymerization of an isoprene-based compound represented by Formula (X) above. In Formula (X), $R^1$ represents an alkyl group or an alkenyl group. For example, $R^1$ represents an alkyl group or an alkenyl group having 1 to 10 carbon atoms (preferably 1 to 6 carbon atoms), and particularly preferably methyl group or 4-methyl-3-pentenyl group.

<Method of Producing Isoprene-Based Polymer of the Present Invention>

An isoprene-based polymer having high isotacticity may be produced by polymerizing an isoprene-based compound represented by Formula (X) above using a complex represented by Formula (A) and a catalyst activator.

A complex represented by Formula (A) may be produced in accordance with the following schemes. A person skilled in the art can easily produce the complex represented by Formula (A) by appropriately selecting starting raw materials, reaction reagents, reaction conditions, etc. with reference to the general synthetic schemes to be shown below, and if necessary, additionally modifying or altering these methods. Note that, the complex represented by Formula (A) may also be synthesized with reference to the descriptions of J. AM. CHEM. SOC. 2004, 126, 9182-9183.

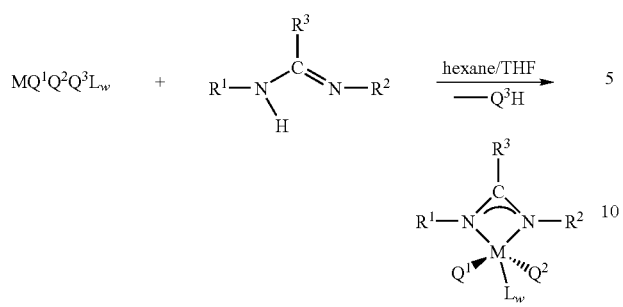

In production of an isoprene-based polymer, the amount of the complex to be used is generally 0.00001 to 0.05 mol, preferably 0.0001 to 0.01 mol with respect to 1 mol of the isoprene-based compound. Decrease in the amount of the complex to that of isoprene may increase the molecular weight of the resultant isoprene-based polymer, while increase in the amount of the complex may decrease the molecular weight of the isoprene-based polymer.

In production of an isoprene-based polymer, the amount of the catalyst activator is generally 0.5 to 5 mol, preferably about 1 mol with respect to 1 mol of the complex represented by Formula (A).

The production method of the isoprene-based polymer of the present invention may be addition polymerization, polycondensation, polyaddition, or the like, and the addition polymerization is preferable.

The polymerization method to be used in production of the isoprene-based polymer of the present invention may be any method such as gas phase polymerization, solution polymerization, or slurry polymerization. In the case of the solution polymerization, a solvent to be used is not particularly limited as long as the solvent is inactive in a polymerization reaction and has an ability to dissolve an isoprene-based compound and a catalyst. Examples thereof include: saturated aliphatic hydrocarbons such as butane, pentane, hexane, and heptane; saturated alicyclic hydrocarbons such as cyclopentane and cyclohexane; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene, and chlorotoluene; and ethers such as tetrahydrofuran and diethyl ether. Of those solvents, a solvent having a melting point lower than 0° C. is preferable, and a solvent having a melting point lower than −20° C. is more preferable. To be specific, an aromatic hydrocarbon is preferable, and chlorobenzene is particularly preferable. As a solvent, one solvent may be used, or a mixed solvent including two or more of them may be used.

The volume of the solvent to be used may be adjusted so that the concentration of the complex in the polymerization catalyst is generally 0.00001 to 0.1 M, preferably 0.0001 to 0.01 M.

The polymerization temperature in the case where the polymerization of the present invention is performed by the solution polymerization may be any temperature, for example, in the range of −100 to 100° C. The temperature is generally 25° C. or lower, preferably −0° C. or lower, more preferably −10° C. or lower, and further preferably −20° C. or lower. Decrease in the polymerization temperature may enhance the tacticity (isotacticity) based on an arrangement of the structural units (I') included in the resultant isoprene-based polymer. That is, adjustment of the polymerization temperature may adjust the isotacticity.

The polymerization time is, for example, about 1 minute to 100 hours, generally 1 minute to 24 hours, and preferably about 5 to 60 minutes. Note that those reaction conditions may be appropriately selected depending on the polymerization reaction temperature, the type and molar quantity of a monomer, the type and amount of a catalyst composition, and the like, and the values are not limited to the exemplified range above. As described above, the polymerization in the present invention is preferably performed at lower temperatures, so that, in the case where the lowering of the temperature causes decrease in the reactivity, it is preferable to extend the polymerization time.

The polymerization reaction may be performed by adding a complex, an isoprene-based compound, a catalytic activator, and another compound in a reaction system in any order, and in general, the reaction is performed by adding a catalytic activator to a mixture of a complex and an isoprene-based compound. Meanwhile, if the polymerization reaction is performed by adding an isoprene-based compound to a mixture of a complex and a catalytic activator, a molecular weight distribution curve of the resultant isoprene-based polymer may have a plurality of peaks (i.e., a mixture of isoprene-based polymers having different molecular weight distribution peaks may be yielded).

After attaining a predetermined polymerization rate of the polymerization reaction, a known polymerization terminator (e.g., methanol containing BHT (2,6-di-t-butyl-4-methylphenol)) may be added to the polymerization system to terminate the reaction, and then, the resultant polymer may be separated from the reaction system in accordance with a general method.

The isoprene-based polymer produced by polymerizing an isoprene-based compound represented by Formula (X) by the production method of the present invention may include the following structural units represented by Formulae (I), (II), (III), and (IV) (hereinafter, each of them is also simply referred to as "structural unit (I), (II), (III), or (IV)") at any proportion. In the structural units (I) to (IV), $R^4$ is an alkyl or alkenyl group. $R^4$ is more preferably methyl group, that is, the most preferable isoprene-based polymer to be produced by the production method of the present invention is polyisoprene. In addition, a preferable example of $R^4$ is a 4-methyl-3-pentenyl group, that is, an example of a preferable polymer is a myrcene polymer.

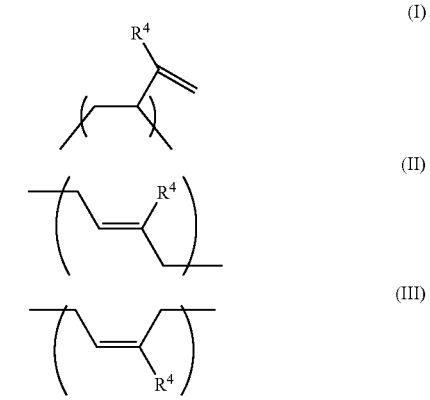

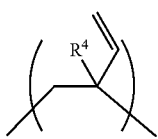
(IV)

The rate of the structural units (I) included in the isoprene-based polymer produced by the production method of the present invention in a microstructure of the polymer is generally 60% or more, preferably 90% or more, more preferably 95% or more, and still more preferably 99% or more. The isoprene-based polymer produced by the production method of the present invention may include the structural units (II) to (IV) at any proportion in addition to the structural units (I). The rate of the structural units (I) in the microstructure may be calculated by measuring an NMR spectrum of the resultant isoprene-based polymer, determining integrated values of peaks attributed to the respective structural units, and comparing the values. The calculation will be described below in the description of the present application.

In general, the structural units (I) included in the isoprene-based polymer are arranged via head-to-tail bonds, and the polymer may have the following two stereoisomers due to the arrangement. That is, the polymer may have the two stereoisomers based on the bond direction of a 1-alkylvinyl or 1-alkenylvinyl group (—C($R^4$)=CH$_2$), or a hydrogen atom to a plane through the main chain of the polymer. The structural units (I) included in the isoprene-based polymer produced by the production method of the present invention are arranged with tacticity, and preferably with high isotacticity. The phrase "arranged with high isotacticity" means a state where the 1-alkylvinyl or 1-alkenylvinyl group (or a hydrogen atom) in Formula (I) is selectively arranged on one side plane through the main chain of the polymer.

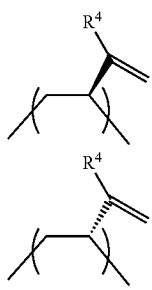

To be specific, the isotacticity based on an arrangement of the structural units (I) included in the isoprene-based polymer produced by the production method of the present invention is at least 60% mm or more, generally 80% mm or more, preferably 90% mm or more, more preferably 95% mm or more, and still more preferably 99% mm or more in terms of triad content, and most preferably 99% mmmm or more in terms of pentad content.

Herein, the triad content will be briefly described. The triad of the structural units (I) in an isoprene-based polymer may include the following three types: isotactic triad; heterotactic triad; and syndiotactic triad. The isotacticity in terms of triad content means a rate of "the isotactic triad" to "the sum of isotactic triad, heterotactic triad, and syndiotactic triad" in a polymer, and the percentage of the rate is represented as "% mm".

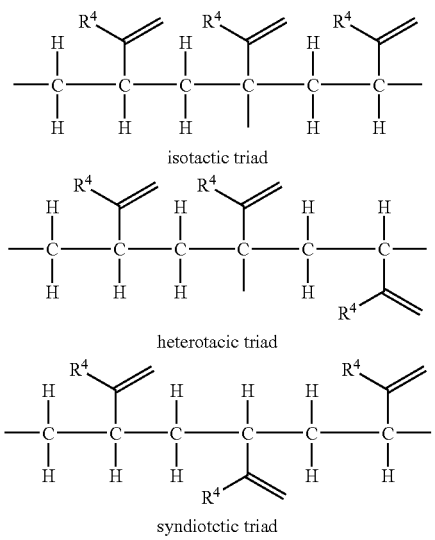

Meanwhile, the isotacticity in terms of pentad content means, as in the case of the triad content, a rate of the isotactic pentads to pentads of the structural units (I) is indicated, and the percentage of the rate is represented as "% mmmm".

The isotacticity based on an arrangement of the structural units (I) included in the isoprene-based polymer may be represented by the triad content or pentad content as described above. The isotacticity of the isoprene-based polymer in terms of triad or pentad content may be calculated from NMR (preferably $^{13}$C-NMR) spectrum data of the resultant isoprene-based polymer. The calculation will be described below in the description of the present application.

The average molecular weight of the isoprene-based polymer produced by the production method of the present invention is any value, but the number average molecular weight of the polymer is 5,000 or more, generally 50,000 or more, and preferably 100,000 or more. The upper limit of the number average molecular weight is not particularly limited but may be about 6,000,000 or less. The number average molecular weight means a number average molecular weight measured by GPC, and the measurement may be performed using, for example, a GPC measuring device (TOSOH HLC 8220 GPC).

The molecular weight distribution ($M_w/M_n$) of the isoprene-based polymer produced by the production method of the present invention is generally 6 or less, preferably 3 or less, and more preferably 1.7 or less. The molecular weight distribution means a molecular weight distribution measured by GPC, and the measurement may be performed using, for example, a GPC measuring device (TOSOH HLC 8220 GPC).

The isoprene-based polymer produced by the production method of the present invention has a 1-alkylvinyl or 1-alkenylvinyl group containing a carbon-carbon double bond as a side chain. The carbon-carbon double bond in the vinyl group may be hydrosilylated, hydroborated, or epoxidized.

The isoprene-based polymer produced by the production method of the present invention may include not only a homopolymer but also a copolymer. Such a copolymer may be, for example, a copolymer of isoprene and an isoprene-based compound other than isoprene or a copolymer of isoprene and a conjugated diene. In addition, it may be a copolymer of an isoprene-based compound and a nonpolar monomer (including ethylene, styrene, etc.) or an isoprene-based compound and a polar monomer (including lactone, acrylic ester, etc.).

The isoprene-based polymer may be identified by $^1$H-NMR analysis, $^{13}$C-NMR analysis, measurements of an average molecular weight and a molecular weight distribution by GPC, IR measurement, mass analysis, or the like. In the description of the present application, the "NMR analysis" means an analysis by nuclear magnetic resonance spectroscopy at a frequency of 400 MHz. The analysis may be performed by using JNM-AL-400RN manufactured by JEOL Ltd., which is an NMR analysis instrument, for example. Meanwhile, "NMR spectrum data" means spectrum data obtained through the analysis. The measurement is performed by using deuterated chloroform, $CDCl_3$, as a solvent at a temperature of 25° C. (room temperature).

The rate of the structural units (3,4-structures) represented by Formula (I) in a microstructure of the isoprene-based polymer may be determined by NMR spectrum data based on the descriptions of the following known documents (W. M. Dong, T. Masuda, J. Polym. Sci., Part A: Polym. Chem., 40, 1838 (2002); A. S. Khatchaturov, E. R. Dolinskaya, L. K. Prozenko, E. L. Abramenko, and V. A. Kormer, Polymer, 18, 871, (1976)).

The isotacticity based on an arrangement of the structural units represented by Formula (I) (i.e., structural units (I)) included in the isoprene-based polymer may be determined by NMR spectrum data. For example, FIGS. 8 and 9 show measurement charts obtained by $^1$H-NMR and $^{13}$C-NMR for a polymer in which the rate of the structural units (I) in a microstructure is 92%, and the isotacticity based on an arrangement of the structural units (I) is 36% mm. FIGS. 8 and 9 show peaks attributed to heterotactic triads (mr) and peaks attributed to syndiotactic triads (rr) as well as peaks attributed to isotactic triads (mm). On the other hand, FIGS. 1 and 2 show measurement charts obtained by $^1$H-NMR and $^{13}$C-NMR for a polymer in which the rate of the structural units (I) in a microstructure is 99.8%, and the isotacticity based on an arrangement of the structural units (I) is 99% mmmm. FIGS. 5 and 6 show measurement charts obtained by $^1$H-NMR and $^{13}$C-NMR for a polymer in which the rate of the structural units (I) in a microstructure is 99.0%, and the isotacticity based on an arrangement of the structural units (I) is 80% mmmm. FIGS. 1, 2, 5, and 6 reveal that the peaks attributed to heterotactic triads (mr) and peaks attributed to syndiotactic triads (rr), which are observed in FIGS. 8 and 9, almost disappear. Further, it is also found that the peaks attributed to isotactic triads (mm) are selectively attributed to isotactic pentads (mmmm) Therefore, the isotacticity based on an arrangement of the structural units (I) included in the isoprene-based polymer may be determined by comparing the integrated values of those peaks.

EXAMPLES

Hereinafter, the present invention will be described in more detail by way of examples, but the scope of the present invention is not limited to the following examples.

Synthesis of Complex

A solution of (NCN)H (bis(2,6-diisopropylphenyl)benzamidine) (0.344 g, 0.781 mmol) in n-hexane (6 ml) was dropped to a 100-ml flask containing a solution of $Y(CH_2C_6H_4NMe_2\text{-}o)_3$ (0.384 g, 0.781 mmol) in toluene (4 ml), and the mixture was stirred overnight. The reaction mixture turned to blight pale-yellow. Subsequently, low-boiling compounds were removed from the reaction mixture, and the residue was dried under reduced pressure to quantitatively yield pale-yellow powder. The resultant powder was washed rapidly with 3 ml of cool hexane and recrystallized in 3 ml of toluene and a small amount of n-hexane to separate $(NCN)Y(CH_2C_6H_4NMe_2\text{-}o)_2$ as crystals (0.529 g, yield 85%). Meanwhile, Sc was used instead of Y $(CH_2C_6H_4NMe_2\text{-}o)_3$, to thereby yield $(NCN)Sc(CH_2C_6H_4NMe_2\text{-}o)_2$.

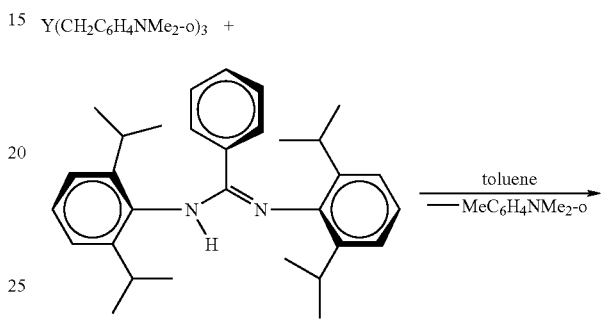

In accordance with the method described in J. AM. CHEM. Soc. 2004, 126, 9182-9183, $(NCN)Sc(CH_2SiMe_3)_2(THF)$, $(NCN)Y(CH_2SiMe_3)_2(THF)$, and $(NCN)Lu(CH_2SiMe_3)_2(THF)$ were produced.

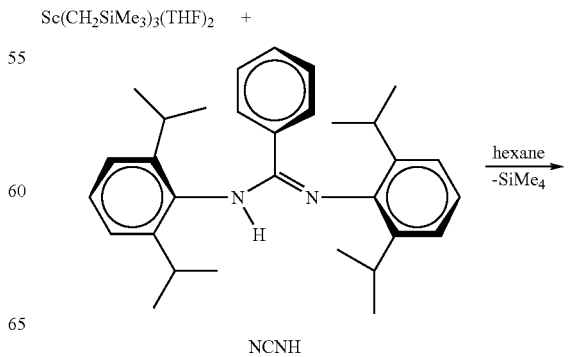

-continued

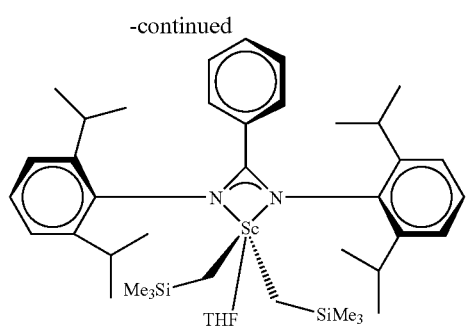

Production of Polyisoprene

The compounds obtained in the following examples were identified by $^1$H-NMR, $^{13}$C-NMR (manufactured by JEOL, JNM-AL 400RN), GPC (TOSOH HLC-8220), and UV (SHIMADZU CORPORATION UV-PC SERIES UV-2400PC/UV-2500PC). Elemental analysis was performed by RIKEN Chemical analysis laboratory.

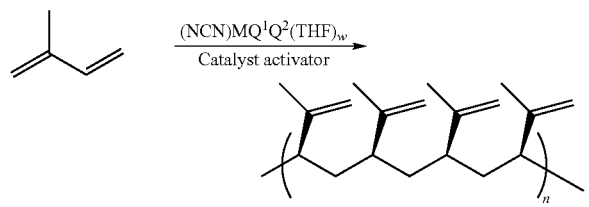

Example 1

In a glove box, a magnetic stirrer was placed in a flask (100 ml) provided with a dropping funnel, and isoprene (1.022 g, 15.0 mmol), (NCN) Sc(CH$_2$SiMe$_3$)$_2$ (THF) (0.015 g, 0.020 mmol), a solution of chlorobenzene (4 ml) were added thereto. Subsequently, a solution of [Ph$_3$C][B(C$_6$F$_5$)$_4$] (0.018 g, 0.020 mmol) in chlorobenzene (1 ml) was added into the dropping funnel. The reaction apparatus was moved outside and set in a cooling bath (−10° C.). Ten minutes later, a solution of [Ph$_3$C][B(C$_6$F$_5$)$_4$] in chlorobenzene was dropped to a mixed solution including isoprene and (NCN)Sc(CH$_2$SiMe$_3$)$_2$(THF) in a flask, and the mixture was stirred at high speed. The mixed solution was stirred at −10° C. for 20 minutes, and methanol was added to terminate the polymerization. The reaction solution was poured to 200 ml of a methanol solution containing a small amount of hydrochloric acid and butylhydroxytoluene (BHT) as a stabilizer. The precipitated polymer product was separated by decantation, cut into small pieces, and washed with methanol, followed by drying under reduced pressure at 60° C., to thereby yield 1.021 g of a polymer (yield: 100%). FIGS. 1 and 2 respectively show $^1$H-NMR spectrum and $^{13}$C-NMR spectrum charts of the resultant polymer. The NMR spectrums were determined at room temperature using deuterated chloroform as a solvent. FIGS. 3 and 4 respectively show GPC and DSC charts of the resultant polymer.

Example 2

The same procedures as in Example 1 were repeated except that the reaction time was changed from 20 minutes to 10 minutes, to thereby yield a polymer.

Example 3

The same procedures as in Example 1 were repeated except that the reaction time was changed from 20 minutes to 5 minutes, and (NCN)Y(CH$_2$SiMe$_3$)$_2$(THF) was used instead of (NCN)Sc(CH$_2$SiMe$_3$)$_2$(THF), to thereby yield a polymer.

Example 4

The same procedures as in Example 1 were repeated except that the reaction temperature and the reaction time were changed from −10° C. to room temperature and from 20 minutes to 5 minutes, respectively, to thereby yield a polymer.
FIGS. 5 and 6 respectively show $^1$H-NMR spectrum and $^{13}$C-NMR spectrum charts of the resultant polymer. The NMR spectrums were determined at room temperature using deuterated chloroform as a solvent. FIG. 7 shows a DSC chart of the resultant polymer.

Example 5

The same procedures as in Example 4 were repeated except that [PhMe$_2$NH][B(C$_6$F$_5$)$_4$] was used instead of [Ph$_3$C][B(C$_6$F$_5$)$_4$], to thereby yield a polymer.

Example 6

The same procedures as in Example 4 were repeated except that (NCN)Y(CH$_2$SiMe$_3$)$_2$(THF) was used instead of (NCN)Sc(CH$_2$SiMe$_3$)$_2$(THF), to thereby yield a polymer.

Reference Example 1

The same procedures as in Example 6 were repeated except that [PhMe$_2$NH][B(C$_6$F$_5$)$_4$] was used instead of [Ph$_3$C][B(C$_6$F$_5$)$_4$], to thereby yield a polymer. FIGS. 8 and 9 respectively show $^1$H-NMR spectrum and $^{13}$C-NMR spectrum charts of the resultant polymer. The NMR spectrums were determined at room temperature using deuterated chloroform as a solvent.

Reference Example 2

The same procedures as in Example 6 were repeated except that B(C$_6$F$_5$)$_3$ was used instead of [Ph$_3$C][B(C$_6$F$_5$)$_4$], to thereby yield a polymer.

Example 7

The same procedures as in Example 4 were repeated except that a solution of (NCN)Sc(CH$_2$SiMe$_3$)$_2$(THF) (0.015 g, 0.020 mmol) in chlorobenzene (8 ml) and a solution of [Ph$_3$C][B(C$_6$F$_5$)$_4$] (0.018 g, 0.020 mmol) in chlorobenzene (2 ml) were used, to thereby yield a polymer.

Example 8

The same procedures as in Example 7 were repeated except that (NCN)Y(CH$_2$SiMe$_3$)$_2$(THF) was used instead of (NCN)Sc(CH$_2$SiMe$_3$)$_2$(THF), to thereby yield a polymer.

Example 9

The same procedures as in Example 7 were repeated except that (NCN)Lu(CH$_2$SiMe$_3$)$_2$(THF) was used instead of (NCN)Sc(CH$_2$SiMe$_3$)$_2$(THF), to thereby yield a polymer.

Example 10

The same procedures as in Example 7 were repeated except that (NCN)Sc(CH$_2$C$_6$H$_4$NMe$_2$-o)$_2$ was used instead of (NCN)Sc(CH$_2$SiMe$_3$)$_2$(THF), to thereby yield a polymer.

Reference Example 3

The same procedures as in Example 7 were repeated except that (NCN)Y(CH$_2$C$_6$H$_4$NMe$_2$-o)$_2$ was used instead of (NCN)Sc(CH$_2$SiMe$_3$)$_2$(THF), to thereby yield a polymer.

Example 11

The same procedures as in Example 7 were repeated except that the reaction temperature and the reaction time were changed from room temperature to −10° C. and from 5 minutes to 20 minutes, respectively, to thereby yield a polymer.

Example 12

The same procedures as in Example 11 were repeated except that (NCN)Y(CH$_2$SiMe$_3$)$_2$(THF) was used instead of (NCN)Sc(CH$_2$SiMe$_3$)$_2$(THF), to thereby yield a polymer.

Example 13

The same procedures as in Example 11 were repeated except that (NCN)Lu(CH$_2$SiMe$_3$)$_2$(THF) was used instead of (NCN)Sc(CH$_2$SiMe$_3$)$_2$(THF), to thereby yield a polymer.

Example 14

The same procedures as in Example 11 were repeated except that (NCN)Sc(CH$_2$C$_6$H$_4$NMe$_2$-o)$_2$ was used instead of (NCN)Sc(CH$_2$SiMe$_3$)$_2$(THF), to thereby yield a polymer.

Example 15

The same procedures as in Example 14 were repeated except that the reaction time was changed from 20 minutes to 30 minutes, to thereby yield a polymer.

Example 16

The same procedures as in Example 14 were repeated except that (NCN)Sc(CH$_2$C$_6$H$_4$NMe$_2$-o)$_2$ was activated in advance with [Ph$_3$C][B(C$_6$F$_5$)$_4$] for 10 minutes, and isoprene was added, followed by stirring for 30 minutes, to thereby yield a polymer.

Example 17

The same procedures as in Example 14 were repeated except that (NCN)Y(CH$_2$C$_6$H$_4$NMe$_2$-o)$_2$ was used instead of (NCN) Sc (CH$_2$C$_6$H$_4$NMe$_2$-o)$_2$, to thereby yield a polymer.

Example 18

The same procedures as in Example 8 were repeated except that the reaction temperature was changed from room temperature to −20° C., to thereby yield a polymer.

Table 1 shows yields (%), number average molecular weights MN, molecular weight distributions M$_w$/M$_n$, percentages of 3,4-polyisoprene to all polyisoprenes, isotacticities (%) in terms of triad content and pentad content, glass transition temperatures T$_g$(° C.), melting points T$_m$(° C.) of polyisoprenes obtained in Examples and Referential Examples. The product other than 3,4-polyisoprene was found to be 1,4-polyisoprene.

Table 1 shows that a polyisoprene having high tacticity can be produced when the polymerization catalyst composition of the present invention is used, and reaction conditions are appropriately selected. In particular, in the case where (NCN)Sc(CH$_2$SiMe$_3$)$_2$(THF) or (NCN)Sc(CH$_2$C$_6$H$_4$NMe$_2$-o)$_2$ is used as a complex, and [Ph$_3$C][B(C$_6$F$_5$)$_4$] is used as a catalyst activator, 3,4-polyisoprene having high tacticity can be produced.

Comparative Example

When each of (NCN)Sc(CH$_2$SiMe$_3$)$_2$(THF) and (NCN)Y(CH$_2$SiMe$_3$)$_2$(THF) was allowed to react in the same way as in Examples without using a catalyst activator at a reaction temperature of room temperature and at a reaction time of 30 minutes, no polymer was produced.

TABLE 1

| | Complex | Catalyst activator | Reaction temperature (° C.) | Reaction time (Minutes) | Yield (%) | M$_n$ (×10$^4$) | M$_w$/M$_n$ | \(\)Microstructure (%)\(\) 3, 4 | mm | mmmm | T$_g$ (° C.) | T$_m$ (° C.) |
|---|---|---|---|---|---|---|---|---|---|---|---|---|
| Example 1 | B (Sc) | a | −10 | 20 | 100 | 19.9 | 1.6 | 99.8 | 100 | 99 | 25 | 156 |
| Example 2 | B (Sc) | a | −10 | 10 | 23 | 7.0 | 1.7 | 99.8 | 100 | 99 | 26 | 157 |
| Example 3 | B (Y) | a | −10 | 5 | 100 | 16.0 | 1.5 | 99.3 | 100 | 99 | 19 | 138 |
| Example 4 | B (Sc) | a | r.t. | 5 | 100 | 12.5 | 1.6 | 99 | 93 | 80 | 23 | — |
| Example 5 | B (Sc) | b | r.t. | 5 | 76 | 8.8 | 1.4 | 97 | 66 | — | 28 | — |
| Example 6 | B (Y) | a | r.t. | 5 | 100 | 7.2 | 1.4 | 92 | 50 | — | 18 | — |
| Referential Example 1 | B (Y) | b | r.t. | 5 | 78 | 5.5 | 1.1 | 92 | 36 | — | 27 | — |
| Referential Example 2 | B (Y) | c | r.t. | 5 | 11 | 1.8 | 1.2 | 92 | — | — | 31 | — |
| Example 7 | B (Sc) | a | r.t. | 5 | 88 | 13.5 | 1.5 | 99 | 93 | 80 | 25 | — |
| Example 8 | B (Y) | a | r.t. | 5 | 100 | 8.2 | 1.4 | 92 | 50 | — | 18 | — |
| Example 9 | B (Lu) | a | r.t. | 5 | 100 | 12.2 | 1.6 | 98 | 76 | — | 27 | — |
| Example 10 | C (Sc) | a | r.t. | 5 | 100 | 16.7 | 2.1 | 97 | 93 | 30 | 23 | — |
| Referential Example 3 | C (Y) | a | r.t. | 5 | 100 | 10.2 | 1.5 | 93 | — | — | 21 | — |
| Example 11 | B (Sc) | a | −10 | 20 | 57 | 13.1 | 1.6 | 99.8 | 100 | 99 | 26 | 158 |
| Example 12 | B (Y) | a | −10 | 20 | 100 | 22.9 | 1.5 | 99.3 | 100 | 99 | 22 | — |
| Example 13 | B (Lu) | a | −10 | 20 | 100 | 21.1 | 1.8 | 99 | 90 | — | 26 | — |
| Example 14 | C (Sc) | a | −10 | 20 | 77 | 14.9 | 2.0 | 99.8 | 100 | 99 | 27 | 153 |

TABLE 1-continued

| | Complex | Catalyst activator | Reaction temperature (°C.) | Reaction time (Minutes) | Yield (%) | $M_n$ (×10⁴) | $M_w/M_n$ | Microstructure (%) | | | $T_g$ (°C.) | $T_m$ (°C.) |
|---|---|---|---|---|---|---|---|---|---|---|---|---|
| | | | | | | | | 3, 4 | mm | mmmm | | |
| Example 15 | C (Sc) | a | −10 | 30 | 89 | 24.0 | 2.0 | 99.8 | 100 | 99 | 26 | 152 |
| Example 16 | C (Sc) | a | −10 | 10 + 30 | 77 | 26.4 | 2.1 | ~100 | 100 | 99 | 26 | 150 |
| Example 17 | C (Y) | a | −10 | 20 | 100 | 18.3 | 1.3 | 99 | 97 | 70 | 24 | — |
| Example 18 | B (Y) | a | −20 | 5 | 85 | 23.3 | 1.3 | 99.5 | 100 | 99 | 22 | 142 |
| Comparative Example | B (Sc) or B (Y) | — | r.t. | 30 | 0 | — | — | — | — | — | — | — |

In Table 1, B and C in the columns of complexes represent complexes represented by Formulae (B) and (C), respectively, and the elements in parenthesis represent central metals (M).

In the columns of catalyst activators, a, b, and c represent [Ph$_3$C][B(C$_6$F$_5$)$_4$], [PhMe$_2$NH][B(C$_6$F$_5$)$_4$], and B(C$_6$F$_5$)$_3$, respectively.

In the columns of reaction temperature, "r.t." means room temperature.

INDUSTRIAL APPLICABILITY

An isoprene-based polymer produced by a production method using a polymerization catalyst composition of the present invention has high isotacticity and is considered to have excellent properties in mechanical or thermal durability. Therefore, the polymer is expected to be used as a plastic material. In particular, the polymerization catalyst composition of the present invention is inexpensive, so that chemical modification of the double bond of the 1-alkylvinyl or 1-alkenylvinyl group in a side chain of the isoprene-based polymer may probably be useful for development of a novel functional polymer.

The invention claimed is:

1. A method of producing an isoprene-based polymer that is an isotactic-rich 3,4 polyisoprene, comprising polymerizing an isoprene-based compound represented by Formula (X) using a polymerization catalyst comprising a complex represented by Formula (A) and a catalyst activator:

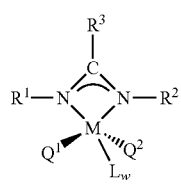

(A)

wherein each of R$^1$ and R$^2$ independently resents an alkyl group, a cyclohexl group, an aryl group, or an aralkyl group;
R$^3$ represents an alkyl group, an alkenyl group, an alkynyl group, an aryl group, an aralkyl group, an aliphatic, aromatic, or cyclic amino group, a phosphino group, a boryl group, an alkylthio or arylthio group, or an alkoxy arloxy group,
M represents a rare earth element selected from the group consisisting of scandium (Sc), yttrium (Y), and lanthanum (La) to lutetium (Lu) with promethium (Pm) excluded;
each of Q$^1$ and Q$^2$ independently represents a monoanionic ligand,
L represents a neutral Lewis base; and
w represents an integer of 0 to 3;

(X)

wherein R$^4$ represents an alkyl group having 1 to 10 carbon atoms or an alkenyl group having 2 to 10 carbon atoms.

2. A method of producing an isoprene-based polymer according to claim 1, wherein R$^4$ in Formula (X) is a methyl group.

3. A method of producing an isoprene-based polymer according to claim 1, wherein:
the polymerization is solution polymerization; and
the polymerization reaction temperature is 0° C. or lower.

4. The method of producing an isoprene-based polymer according to claim 1, wherein each of R$^1$ and R$^2$ in Formula (A) represents a 2,6-diisopropylphenyl group, and R$^3$ represents a phenyl group.

5. The method of producing an isoprene-based polymer according to claim 1, wherein the complex represented by Formula (A) is a compound represented by Formula (B):

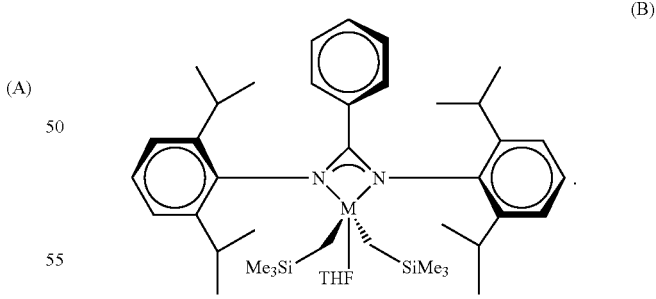

(B)

6. A method of producing an isoprene-based polymer, according to claim 1, wherein the catalyst activator is an ionic compound of a non-coordinating anion and cation.

7. A method of producing an isoprene-based polymer, according to claim 6, wherein the non-coordinating anion is a tetravalent boron anion.

8. The method of producing an isoprene-based polymer according to claim 1, wherein said polymer has an isotacticity between 60% mm and 99% mm in terms of triad content.

9. The method of producing an isoprene-based polymer according to claim 1, wherein said polymer has an isotacticity between 80% mm and 99% mm in terms of triad content.

10. A method of producing an isoprene-based polymer, comprising polymerizing an isoprene-based compound represented by Formula (X)

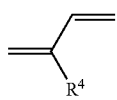

(X)

wherein $R^4$ represents an alkyl group having 1 to 10 carbon atoms or an alkenyl group having 2 to 10 carbon atoms;

using a polymerization catalyst composition comprising a compound represented by Formula (C) and a catalyst activator:

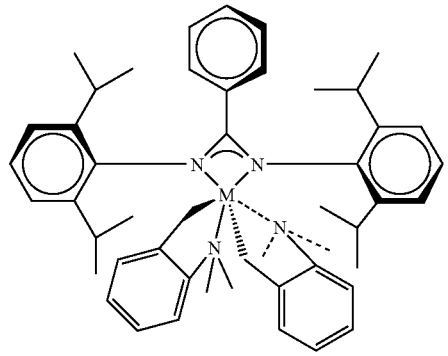

(C)

wherein M represents a rare earth element selected from the group consisting of scandium (Sc), yttrium (Y), and lanthanum (La) to lutetium (Lu) with promethium (Pm) excluded.

* * * * *